United States Patent
Kawano

[11] Patent Number: 6,014,180
[45] Date of Patent: Jan. 11, 2000

[54] AUTOMATIC GAIN CONTROL LOOP CIRCUIT

[75] Inventor: Mitsumo Kawano, Yokohama, Japan

[73] Assignee: Kabushiki Kaisha Toshiba, Kawasaki, Japan

[21] Appl. No.: 08/931,458

[22] Filed: Sep. 17, 1997

[30] Foreign Application Priority Data

Sep. 18, 1996 [JP] Japan .................................. 8-246438

[51] Int. Cl.[7] ..................................................... H04N 5/52
[52] U.S. Cl. ........................... 348/678; 348/679; 348/255; 348/910; 386/9; 386/93; 455/239.1; 330/281
[58] Field of Search ................................ 360/67; 386/10, 386/9, 93; 73/900; 348/678, 255, 679, 910, 607; 330/281, 282, 283, 141, 134; 333/14; 455/239.1, 240.1, 245.1, 250.1; H04N 5/52

[56] References Cited

U.S. PATENT DOCUMENTS

| | | | |
|---|---|---|---|
| 4,417,284 | 11/1983 | Sato | 386/10 |
| 4,422,049 | 12/1983 | Akagiri et al. | 330/134 |
| 4,884,141 | 11/1989 | Hyakutake | 348/678 |
| 5,276,517 | 1/1994 | Matsuzawa et al. | 348/678 |
| 5,386,296 | 1/1995 | Craft | 348/647 |
| 5,510,853 | 4/1996 | Kawano | 348/678 |
| 5,532,829 | 7/1996 | Kawamura | 348/644 |

Primary Examiner—Michael H. Lee
Assistant Examiner—Jean W. Désir
Attorney, Agent, or Firm—Oblon, Spivak, McClelland, Maier & Neustadt, P.C.

[57] ABSTRACT

In an automatic gain control loop circuit supplied with two channel signals alternately input thereto, a first capacitor filter and stores the first signal output from the level detector circuit, and a second capacitor filters and stores the second signal output from the level detector circuit. The second signal is output only during the signal period of a second channel included in the two channels. An adder adds the second signal stored in the second capacitor to the first signal stored in the first capacitor. A switch selects the first signal stored in the first capacitor during the signal period of the first channel, and selects an output from the adder during the signal period of the second channel. The selected signal is fed back to the gain control input terminal of the variable-gain amplifier circuit. With there features, a flicker is prevented from occurring when the two channel signals are switched.

12 Claims, 3 Drawing Sheets

AUTOMATIC GAIN CONTROL LOOP CIRCUIT

BACKGROUND OF THE INVENTION

The present invention relates to an automatic gain control (AGC) loop circuit, and more particularly to an automatic gain control loop circuit that controls two-channel input signals to be the same in level. The AGC loop circuit is employed in the color signal reproducing system of a videotape recorder (VTR) or the video signal processing system of a TV receiver.

In a domestic-use VTR, which performs recording/reproduction of video signals, the brightness signal component of a video signal is converted into a low-frequency carrier FM signal, while the color signal component thereof is converted into a down-converted color signal which is lower in frequency than the low-frequency carrier FM signal. The low-frequency carrier FM signal and the down-converted color signal are synthesized together, and the signal obtained thereby is magnetically recorded on videotape.

In a helical scan type VTR, videotape is wrapped around a rotatable cylinder and is made to travel in this state. A signal is recorded alternately in the two adjacent tracks of the videotape by means of two video heads that are mounted on the circumference of the rotatable cylinder.

At the time of reproduction, the two-channel signals are reproduced by the two video heads and alternately selected, thereby providing a continuous signal.

If the two video heads differ in performance or operation, signals having different amplitudes are alternately output. Usually, the signals with different amplitudes are switched from one to the other at the intervals of one scanning period. The output of such signals adversely affects the video signals, particularly the color component, resulting in so-called flickering.

In a conventional VTR, an automatic color amplification control (ACC) loop having an AGC function is incorporated in the color signal reproduction system. By the color signal amplification control of this loop, the color signal components of the signals reproduced by the two video heads are controlled to be the same in level, thereby suppressing the flickering.

FIG. 1 shows a signal reproduction system incorporated in a VTR.

Referring to FIG. 1, signals reproduced by two video heads (namely, "A"-head 41 and "B"-head 42) are amplified by play-back pre-amplifier circuits 43 and 44, respectively. Then, the signals are alternately selected by a switch circuit 45, thereby obtaining a continuous signal. The operation of switch circuit 45 is controlled by the control signal for controlling the operation of video heads 41 and 42.

A signal output from the switch circuit 45 is supplied to a color signal reproduction system. In this system, the signal is first input to LPF (low-pass filter) 46, so as to remove the brightness signal component (i.e., a low-frequency carrier wave FM signal) therefrom. A reproduced low-frequency band color signal, thus obtained, is supplied to an ACC loop circuit 10.

Conventionally, the ACC loop circuit 10 employed in the signal reproduction system shown in FIG. 1 has such a circuit configuration as is shown in FIG. 5, for example.

In the ACC loop circuit shown in FIG. 5, the two-channel signals alternately selected by the switch circuit 45 are first amplified by a variable-gain amplifier circuit 51 and then supplied to a frequency converter circuit 52. By this converter circuit 52, the signals are mixed with a 4.2 MHz local signal, so as to produce a 3.58 MHz-band carrier color signal. The carrier color signal is supplied to a next stage circuit (not shown) and a level detector circuit 53. The level detector circuit 53 detects the level of a color burst signal, and outputs first and second signals I1 and I2. The second signal I2 has a level substantially proportionate to a level of the first signal I1.

In this case, a first switch 54 is controlled such that the output level of the level detector circuit 53 is stored in capacitor C1 or C2 (which serves as a low-pass filter) during the channel period of the channel corresponding to one of the video heads 41 and 42. In addition, a second switch 55 is controlled such that the voltage kept in capacitor C1 or capacitor C2 is selected in accordance with the channel period and such that the selected voltage is fed back to the variable-gain amplifier circuit 51. The operation of switches 54 and 55 are controlled by the control signal for controlling the operation of video heads 41 and 42 (FIG. 1). According to the operation of the switches 54 and 55, the first and second signals I1 and I2 are fed back to the variable-gain amplifier circuit 51 as a gain control signals (negative feedback).

Since the two capacitors C1 and C2 hold the voltages corresponding to the two-channel color signal levels, no level difference between the color signals of the two channels (or the heads) can be obtained, thus suppressing the flickering. The flicker suppression system is referred to as a channel ACC system.

It should be noted, however, that the levels of the color signals do vary even in the channel periods though the variations themselves are slight. To cope with the level variations, each of the capacitors C1 and C2 serving as filters (at least two capacitors are required) has to be accurately controlled to have optimal capacitance. This results in an increase in the cost for the circuit components.

Moreover, since the two capacitors C1 and C2 serving as filters must have a high response characteristic, their capacitance is set to be relatively small. This being so, current leakage is likely to occur, and the voltages held in the capacitors become lower. Since a level difference is inevitably brought about when the reproduction signals corresponding to the video heads 41 and 42 switch from one to the other, the flickering cannot be suppressed completely.

As described above, the conventional automatic gain control loop circuit (which performs automatic gain control in such a way that two-channel signals alternately input are controlled to be the same in amplitude) requires at least two capacitors which serve as filters and which have such a small-valued capacitance as to appropriately respond to two-channel signals. When the two-channel signals switch from one to the other, a level difference is produced between the voltages held by the two capacitors, resulting in imperfect suppression of the flickering.

BRIEF SUMMARY OF THE INVENTION

The present invention has been developed in consideration of the above circumstances, and an object of the invention is to provide an automatic gain control loop circuit which performs automatic gain control in such a way that two-channel signals alternately input are controlled to be the same in amplitude, which enables a reduction in the cost for a capacitor that serves as a filter, and which can reliably suppress the flickering when the two-channel signals switch from one to the other.

To attain the above object, the present invention provides an automatic gain control loop circuit comprising: a variable-gain amplifier circuit which is capable of controlling gain and which amplifies signals that are alternately input thereto from two channels; a level detector circuit for detecting a level of a signal derived from an output signal of the variable-gain amplifier circuit and for outputting a first signal and a second signal having a level substantially proportionate to a level of the first signal; a first capacitor for low-pass filtering and storing the first signal output from the level detector circuit; a second capacitor for low-pass filtering and storing the second signal output from the level detector circuit during a signal period of a second channel included in the two channels; an adder circuit for adding the second signal held by the second capacitor to the first signal held by the first capacitor; and a switch circuit for selecting the first signal stored in the first capacitor during a signal period of a first channel included in the two channels and selecting an output from the adder circuit during the signal period of the second channel, and for feeding a selected signal back to a gain control input terminal of the variable-gain amplifier circuit.

The signals from the two channels may be reproduced by means of two heads of the VTR, then amplified by respective play-back pre-amplifier circuits, and then alternately selected to form a continuous signal. The continuous signal may be subjected to low-pass filtration by a low-pass filter, thereby obtaining a reproduction low-frequency color signal. The level detector circuit may be a level detector circuit for detecting a level of an output signal of a frequency converting circuit that reproduces a carrier color signal from an output signal of the variable gain amplifier circuit.

The second signal may be equivalent in phase to the first signal, and the adder circuit may add to the first signal a signal equivalent in phase to the second signal.

The second signal may be opposite in phase to the first signal, and the adder circuit may add to the first signal a signal opposite in phase to the second signal.

The present invention also provides an automatic gain control loop circuit comprising: a variable-gain amplifier circuit which is capable of controlling gain and which amplifies signals that are alternately input thereto from two channels; a level detector circuit for detecting a level of a signal derived from an output signal of the variable-gain amplifier circuit and for outputting a first signal current and a second signal current having a level substantially proportionate to a level of the first signal current, the second signal current being output only during a signal period of a second channel included in the two channels; a first capacitor for low-pass filtering and storing the first signal output from the level detector circuit; a second capacitor for low-pass filtering and storing the second signal output from the level detector circuit; a current-output type first arithmetic operation circuit having an inverted input terminal to which the second signal stored in the second capacitor is supplied, and a non-inverted input terminal to which a reference voltage Vref is applied; a first switch circuit for switching the first arithmetic operation circuit between an active state and an inactive state; and a second arithmetic operation circuit having a non-inverted input terminal to which the first signal stored in the first capacitor is supplied, and an inverted input terminal to which an output terminal of the first arithmetic operation unit is connected, a voltage output from the second arithmetic operation unit being fed back to a gain-controlled input terminal of the variable-gain amplifier circuit.

The signals from the two channels may be reproduced by means of two heads of the VTR, then amplified by respective play-back pre-amplifier circuits, and then alternately selected to form a continuous signal. The continuous signal may be subjected to low-pass filtration by a low-pass filter, thereby obtaining a reproduction low-frequency color signal. The level detector circuit may be a level detector circuit for detecting a level of an output signal of a frequency converting circuit that reproduces a carrier color signal from an output signal of the variable gain amplifier circuit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

DETAILED DESCRIPTION OF THE INVENTION

An embodiment of the present invention will now be described.

Figure 1:
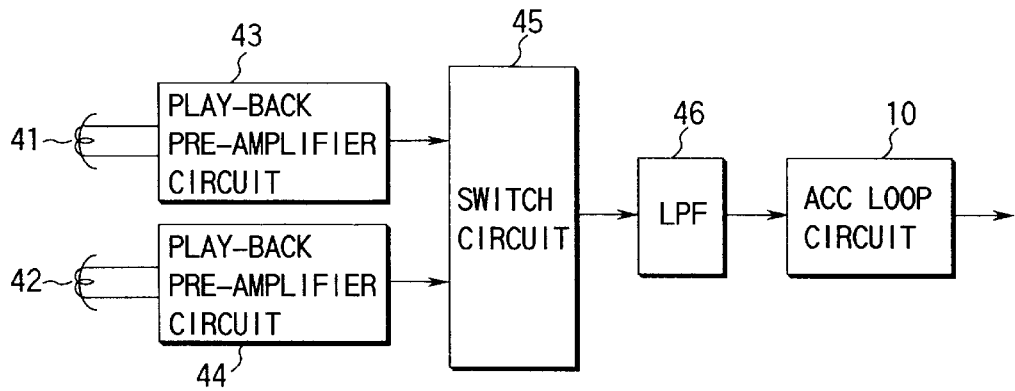
FIG. 1 is a block circuit diagram showing part of a signal reproduction system incorporated in a VTR.
Figure 2:
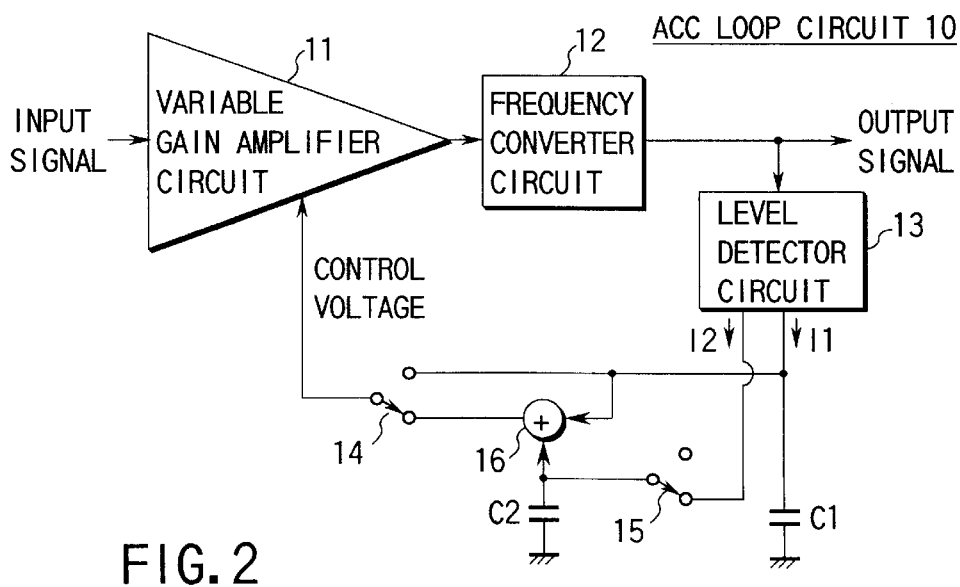
FIG. 2 is a circuit diagram of an ACC loop circuit incorporating an AGC loop circuit embodying the present invention.

FIG. 2 is a circuit diagram of an ACC loop circuit incorporating an AGC loop circuit according to the first embodiment of the present invention. The ACC circuit is obtained by improving the ACC loop circuit 10 described above with reference to FIG. 1, i.e., the ACC loop circuit incorporated in the color signal reproduction system of the conventional VTR.

A signal input to the ACC loop circuit shown in FIG. 2 is similar to that input to ACC loop circuit shown in FIG. 1. As shown in FIG. 1, signals reproduced by two video heads 41 and 42 are first amplified by play-back pre-amplifier circuits 43 and 44, respectively, and then alternately selected by switch circuit 45, thereby obtaining a continuous signal. This continuous signal is filtered by an LPF 46 and then supplied to the ACC loop circuit shown in FIG. 2. In other words, the signals reproduced from channels of videotape are alternately supplied to the ACC circuit shown in FIG. 2.

Figure 3:
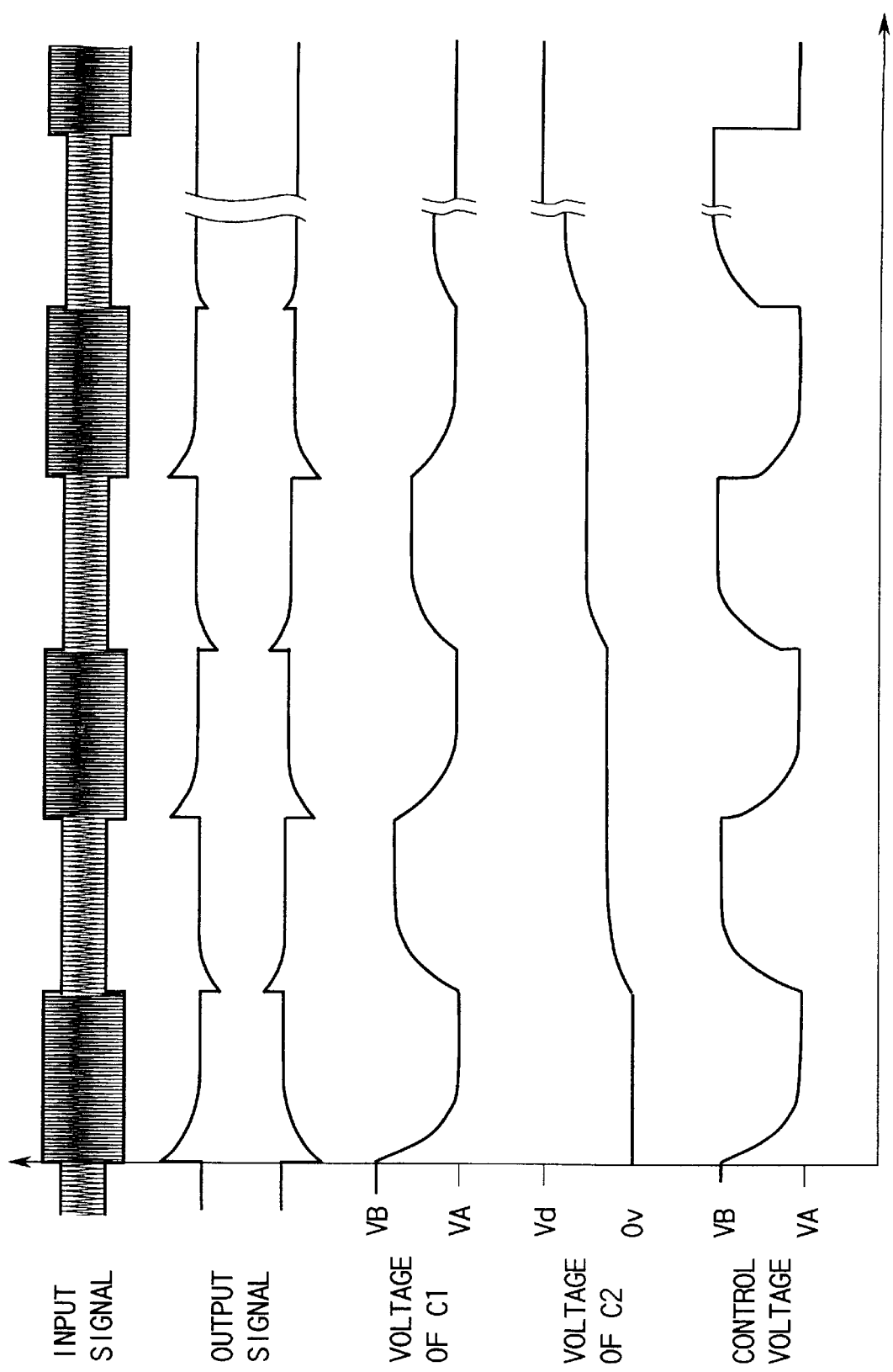
FIG. 3 is a signal waveform chart illustrating an operation of the AGC loop circuit depicted in FIG. 2.

The ACC loop circuit shown in FIG. 2 is a channel ACC system and performs automatic gain control in such a manner that the signals alternately input are the same in amplitude. Examples of waveforms of the ACC loop circuit are shown in FIG. 3.

In the ACC loop circuit shown in FIG. 2, the input signal is first amplified by a variable-gain amplifier circuit 11 and then supplied to a frequency converter circuit 12. By this converter circuit 12, the signal is mixed with a 4.2 MHz local signal, so as to demodulate the signal as a 3.58 MHz-band carrier color signal.

The carrier color signal is supplied to a next stage circuit and a level detector circuit 13. The level detector circuit 13 detects the level of a color burst signal, and outputs first and second signals I1 and I2. The second signal I2 has a level substantially proportionate to a level of the first signal I1. In the present embodiment, the first and second signals I1 and I2 are output in the form of current. The ACC loop circuit shown in FIG. 2 may be designed such that the second signal is produced only in the second one of the two channels.

The ACC loop circuit shown in FIG. 2 is provided with a first capacitor C1 for low-pass filtering the first signal I1 output from the level detector circuit 13, and a first switch circuit 14 for selecting that first signal I1 during the signal interval of the first one of the two channels. The first capacitor C1 has a comparatively small-valued capacitance so that it can appropriately respond to the first signal I1 output from the level detector circuit 13.

In addition, the ACC loop circuit shown in FIG. 2 is provided with a second switch for selecting the second signal I2 output from the level detector circuit 13 only in the signal period of the second channel, a second capacitor C2 for low-pass filtering and storing the signal selected and output by the second switch circuit 15, and an adder circuit 16 for adding the signal stored in the second capacitor C2 to the output signal from the first capacitor C1. The second capacitor C2 has a large-valued capacitance in comparison with that of the first capacitor C1. The operation of the first and second switch circuits 14 and 15 is controlled by the control signal for controlling the operation of the video heads 41 and 42 (FIG. 1).

The first switch circuit 14 selects an output from the first capacitor C1 during the signal period of the first channel, and selects an output from the adder circuit 14 during the signal period of the second channel. An output selected by the first switch circuit 14 is fed back to the gain-control input terminal of the variable gain amplifier circuit 11.

A description will be given as to how the above-mentioned ACC loop circuit operates. During the signal period of the first channel, the first signal I1 output from the level detector circuit 13 is supplied to the first capacitor C1, for low-pass filtration. A voltage output from this first capacitor C1 is selected by the first switch circuit 14 and is thus fed back to the gain control input terminal of the variable-gain amplifier circuit 11.

During the signal period of the second channel signal, the second signal output I2 from the level detector circuit 13 is selected by the second switch circuit and is supplied to the second capacitor C2, for low-pass filtration. An output voltage from this second capacitor C2 is added to an output from the first capacitor C1 by the adder circuit 16. An output from this adder circuit 16 is selected by the first switch 14 and fed back to the gain control input terminal of the variable-gain amplifier circuit 11.

When the signal periods of the first and second channels alternate with each other, the voltage selected and output by the first switch circuit 14 (i.e., the voltage fed back to the gain control input terminal of the variable gain amplifier circuit 11) becomes substantially constant as long as the ACC loop is stable. As in the conventional channel ACC system, the signals reproduced from the two channels are controlled to be the same in amplitude, and the ACC operation is performed in such a manner as to suppress the flickering.

It should be noted that the second capacitor C2 stores the correcting voltage corresponding to the level difference which the first signal I1 has between the signal periods of the first and second channels. Although the second capacitor C2 is required to have a capacitance greater than that of the first capacitor C1, it does not require very high accuracy.

Since the capacitance of the second capacitor C2 set to be comparatively large, current leakage hardly occurs when the color signal level is held. Accordingly, the voltage held by the second capacitor does not much lower, and flickering does not occur when the signals derived from the two channels switch from one to the other.

As described above, the ACC loop circuit shown in FIG. 2 performs an ACC operation in such a manner that the signals derived from two channels and alternately input are controlled to be the same in amplitude.

The capacitance of the first capacitor C1 is determined with high accuracy and it is a comparatively small value so that the first capacitor C1 can appropriately respond to the first signal I1 output from the level detector circuit 13. In contrast, the capacitance of the second capacitor C2 is only required to be greater than that of the first capacitor C1, and need not be determined with high accuracy.

As can be understood from the above, there can be employed as the second capacitor C2 a filtration capacitor of a chromatic ACC loop used at the time of recording data in VTR (i.e., a loop used for controlling the amplitude of a recording signal in accordance with the average level of chromatic signals produced during a vertical scanning period). Accordingly, the number of capacitors required in the ACC loop circuit shown in FIG. 2 is smaller than that required in the conventional ACC loop circuit shown in FIG. 1.

If the second signal I2 and the first signal I1 are opposite in phase, the output voltage of the second capacitor C2 is reversed in phase before it is added to the output voltage of the first capacitor C1 by the adder circuit 16. In other words, the output voltage of the second capacitor C2 is subtracted from the output voltage of the first capacitor C1.

A detailed description will now be given with reference to FIG. 3 as to how the ACC loop circuit shown in FIG. 2 controls the amplitudes of color signals. In the description below, it is assumed that the level which an input low-frequency color signal reproduced from videotape has during the signal period of a first channel is twice as high as that the level which it has during the signal period of a second channel, that the first and second signals are the same in phase, and that the initial value of the output voltage of the first capacitor C1 is zero.

During the signal period of the first channel, the signal I1 output from the level detector circuit 13 is subjected to low-pass filtration by the first capacitor C1. An output voltage of this first capacitor C1 is selected by the first switch circuit 14 and fed back to the gain control input terminal of the variable-gain amplifier circuit. Hence, the ACC operation of the embodiment is similar to that of the conventional art.

At the end of the signal period of the second channel, the output voltage of the first capacitor is set to be high in level, so as to increase the gain of the variable-gain amplifier circuit 11. (The level of that output voltage is VB, for example.) Immediately after the signal period switches to that of the first channel, the gain of the ACC loop is still large, but the output voltage of the first capacitor Cl gradually lowers in level. (The level of the output voltage converges to VA, for example.)

When the signal period has switched to that of the second channel, the output voltage of the second capacitor C2 gradually increases in level. The level of that output voltage continues to increase until the sum of the output voltages of the first and second capacitors C1 and C2 becomes higher in level than VB.

After repeated alteration of the signal periods of the first and second periods mentioned above, the output voltage Vd of the second capacitor C2 satisfies the formula Vd=VB−VA. Accordingly, the output voltage of the first capacitor is VA and constant.

Figure 4:
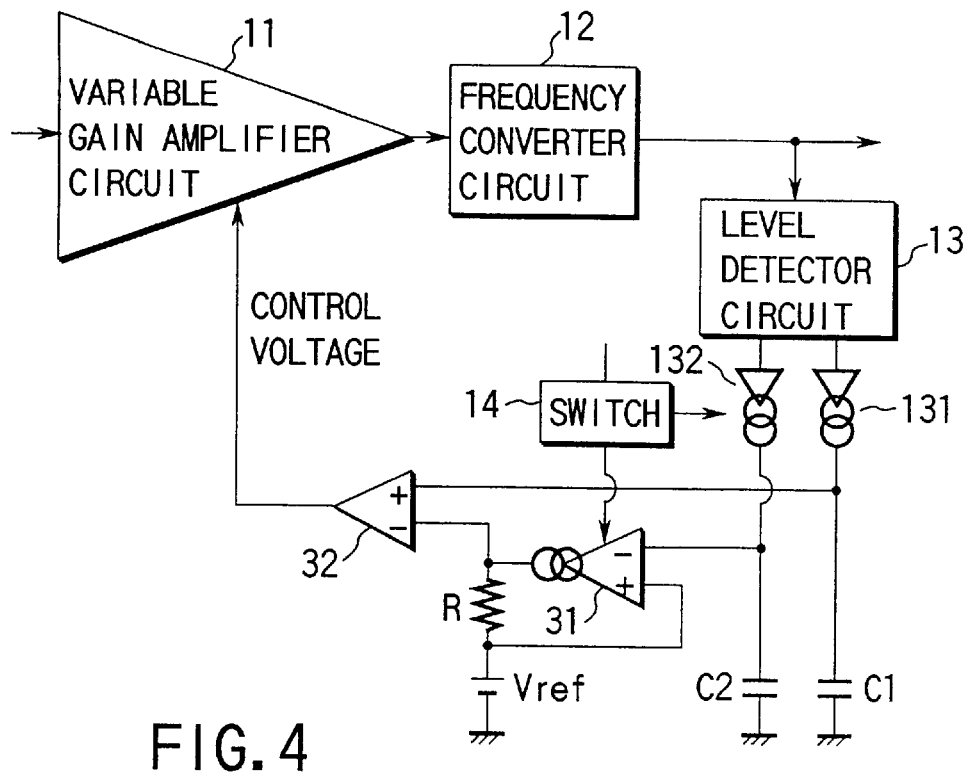
FIG. 4 is a circuit diagram showing a modification of the ACC loop circuit depicted in FIG. 2.
Figure 5:
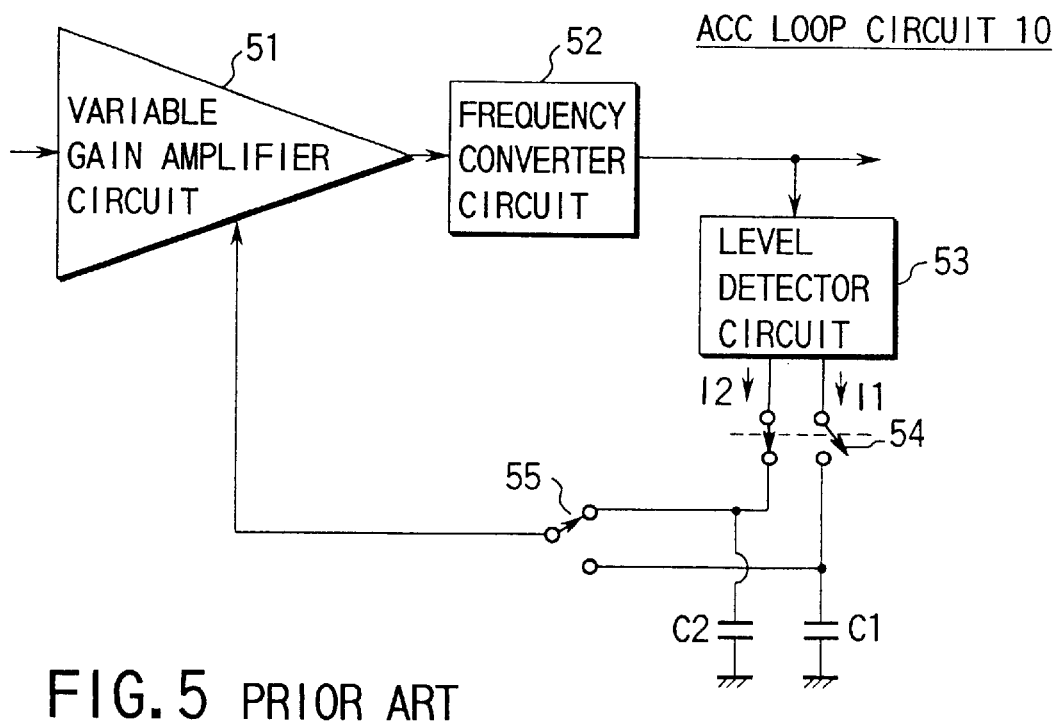
FIG. 5 is a circuit diagram showing the prior art of the ACC loop circuit depicted in FIG. 1.

FIG. 4 shows a modification of the ACC loop circuit shown in FIG. 2. The ACC loop circuit in FIG. 4 is similar to that in FIG. 2, except for the following points:

(1) A first current source 131 is shown as a first signal output source of a level detector circuit 13, while a second current source 132 is shown as a second signal output source.

(2) An output voltage of the second capacitor C2 is supplied to the inverted input terminal (−) of a first operational amplifier circuit 31, which is of a current output type. A reference voltage Vref is applied to the non-inverted input terminal (+) of the first operational amplifier circuit 31. A feedback resistor element R is inserted between the output terminal and non-inverted input terminal (+) of the first operational amplifier circuit 31.

(3) A first switch circuit 14 is not employed for switching between the selection and non-selection of the output voltage of the second capacitor C2. Rather, it is employed for controlling the output of a current from the second current source and for controlling the first operational amplifier circuit 31 between an active state and an inactive state.

(4) An output voltage of the first capacitor C1 is supplied to the non-inverted input terminal (+) of a second operational amplifier circuit 32, and the output terminal of the first operational amplifier circuit 31 is connected to the inverted input terminal (−) of the second operational amplifier circuit 32.

(5) A switch corresponding to the second switch 15 shown in FIG. 2 is not provided, and an output voltage from the second operational amplifier circuit is fed back to the gain control input terminal of the variable-gain arithmetic circuit 11.

The ACC loop circuit shown in FIG. 4 operates in a manner similar to that described above with reference to the waveform chart shown in FIG. 3. In other words, the ACC loop circuit shown in FIG. 4 controls the amplitudes of color signals in a manner similar to that of the ACC loop circuit shown in FIG. 2.

The AGC circuit of the present invention is applicable not only to the VTR mentioned above but also to an apparatus designed exclusively for reproducing data from videotape. In addition, the present invention is applicable to the video signal processing system of a television receiver, more particularly to a circuit which is alternately supplied with two video signals and used for switching the display window to another during the horizontal scanning period of a video image display apparatus. In this case, the present invention is used for controlling the two video signals to be the same in bright or chromatic level.

Jpn. Pat. Appln KOKAI Publication No. 5-244635 relates to an ACC circuit for dealing with color burst signals of the reproduction system of a VTR. More specifically, the Japanese Publication is directed to a technique for improving a high-frequency response characteristic even if a rapid level change occurs immediately after the head in use is switched to the other. Jpn. Pat. Appln KOKAI Publication No. 5-328395 also relates to an ACC circuit incorporated in the reproduction system of a VTR, more particularly to a technique of enhancing the sensitivity to waves only at time immediately after the head switching. Likewise, Jpn. Pat. Appln KOKAI Publication No. 7-184229 relates to an ACC circuit incorporated in the reproduction system of a VTR, more particularly to a technique for improving a response characteristic so as to suppress ACC voltage distortions in the vertical blanking period.

However, these references do not disclose or suggest the present invention, which is directed to a correcting technique based on the level difference between the signals desired from two channels.

As described in the foregoing, the AGC loop circuit of the present invention is incorporated in a loop circuit that executes automatic gain control in such a manner that two signals alternately input from two channels are controlled to the same in amplitude. The AGC loop circuit comprises two capacitors, each serving as a filter. One of the capacitors has a comparatively high capacitance, while the other has a comparatively low capacitance. By use of these two capacitors, the AGC loop circuit of the present invention suppresses the flickering when the signals from the two channels switch from one to the other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. An automatic gain control loop circuit comprising:

a variable-gain amplifier circuit, capable of controlling gain, for amplifying video signals that are alternately input thereto from two channels, and for outputting an output signal;

a level detector circuit for detecting a level of a signal derived from the output signal of the variable-gain amplifier circuit and for outputting a first signal and a second signal having a level substantially proportionate to a level of the first signal;

a first capacitor for low-pass filtering and storing the first signal output from the level detector circuit;

a second capacitor for low-pass filtering and storing the second signal output from the level detector circuit during a signal period of a second channel included in the two channels;

an adder circuit for adding the second signal stored by the second capacitor to the first signal stored by the first capacitor; and a switch circuit for selecting the first signal stored in the first capacitor during a signal period of a first channel included in the two channels and selecting an output from the adder circuit during the signal period of the second channel, and for feeding a selected signal back to a gain control input terminal of the variable-gain amplifier circuit.

2. The automatic gain control loop circuit according to claim 1, wherein:

the video signals from the two channels are reproduced by means of two heads of the VTR, then amplified by respective play-back pre-amplifier circuits, and then alternately selected to form a continuous signal, said continuous signal being subjected to low-pass filtration by a low-pass filter, thereby obtaining a reproduction low-frequency color signal; and said level detector circuit is a level detector circuit for detecting a level of an output signal of a frequency converting circuit that reproduces a carrier color signal from an output signal of the variable gain amplifier circuit.

3. The automatic gain control loop circuit according to claim 1, wherein said second signal is equivalent in phase to the first signal, and said adder circuit adds to the first signal a signal equivalent in phase to the second signal.

4. The automatic gain control loop circuit according to claim 1, wherein said second signal is opposite in phase to the first signal, and said adder circuit adds to the first signal a signal opposite in phase to the second signal.

5. The automatic gain control loop circuit according to claim 1, wherein the video signals contain color signals.

6. The automatic gain control loop circuit according to claim 1, wherein the video signals contain brightness signals.

7. The automatic gain control loop circuit according to claim 2, wherein said second signal is equivalent in phase to the first signal, and said adder circuit adds to the first signal a signal equivalent in phase to the second signal.

8. The automatic gain control loop circuit according to claim 2, wherein said second signal is opposite in phase to the first signal, and said adder circuit adds to the first signal a signal opposite in phase to the second signal.

9. An automatic gain control loop circuit comprising:

a variable-gain amplifier circuit, capable of controlling gain, for amplifying video signals that are alternately input thereto from two channels, and for outputting an output signal;

a level detector circuit for detecting a level of a signal derived from the output signal of the variable-gain amplifier circuit and for outputting a first signal current and a second signal current having a level substantially proportionate to a level of the first signal current, said second signal current being output only during a signal period of a second channel included in the two channels;

a first capacitor for low-pass filtering and storing the first signal output from the level detector circuit;

a second capacitor for low-pass filtering and storing the second signal output from the level detector circuit;

a current-output type first arithmetic operation circuit having an inverted input terminal to which the second signal stored in the second capacitor is supplied, and a noninverted input terminal to which a reference voltage Vref is applied;

a switch circuit for switching the first arithmetic operation circuit between an active state and an inactive state; and a second arithmetic operation circuit having a non-inverted input terminal to which the first signal stored in the first capacitor is supplied, and an inverted input terminal to which an output terminal of the first arithmetic operation unit is connected, a voltage output from the second arithmetic operation unit being fed back to a gain-controlled input terminal of the variable-gain amplifier circuit.

10. The automatic gain control loop circuit according to claim 9, wherein:

the video signals from the two channels are reproduced by means of two heads of the VTR, then amplified by respective play-back pre-amplifier circuits, and then alternately selected to form a continuous signal, said continuous signal being subjected to low-pass filtration by a low-pass filter, thereby obtaining a reproduction low-frequency color signal; and said level detector circuit is a level detector circuit for detecting a level of an output signal of a frequency converting circuit that reproduces a carrier color signal from an output signal of the variable gain amplifier circuit.

11. The automatic gain control loop circuit according to claim 9, wherein the video signals contain color signals.

12. The automatic gain control loop circuit according to claim 9, wherein the video signals contain brightness signals.

* * * * *